United States Patent
Lee

(10) Patent No.: US 8,713,031 B1
(45) Date of Patent: Apr. 29, 2014

(54) METHOD AND SYSTEM FOR CHECKING CITATIONS

(76) Inventor: Bryant Christopher Lee, Bethesda, MD (US)

(*) Notice: Subject to any disclaimer, the term of this patent is extended or adjusted under 35 U.S.C. 154(b) by 0 days.

(21) Appl. No.: 13/507,918

(22) Filed: Aug. 7, 2012

Related U.S. Application Data

(60) Provisional application No. 61/573,446, filed on Sep. 6, 2011.

(51) Int. Cl.
*G06F 7/00* (2006.01)

(52) U.S. Cl.
USPC ............ 707/755; 704/9; 707/756; 707/737

(58) Field of Classification Search
USPC .......................... 707/737, 755, 756
See application file for complete search history.

(56) References Cited

U.S. PATENT DOCUMENTS

| | | | |
|---|---|---|---|
| 7,028,259 B1 | 4/2006 | Jacobson | |
| 7,844,899 B2 | 11/2010 | Boucher | |
| 7,966,170 B2 | 6/2011 | Dalal et al. | |
| 8,001,457 B2 | 8/2011 | Rosenoff et al. | |
| 8,019,769 B2 | 9/2011 | Rolle | |
| 2007/0022414 A1* | 1/2007 | Bird | 717/143 |
| 2008/0059435 A1* | 3/2008 | Steensgard | 707/3 |
| 2008/0071803 A1* | 3/2008 | Boucher | 707/100 |
| 2011/0066616 A1 | 3/2011 | Rhoads et al. | |
| 2011/0208769 A1* | 8/2011 | Kemp | 707/769 |

OTHER PUBLICATIONS

Charles Donnelly and Richard Stallman, Bison (Jul. 27, 2012) available at http://www.gnu.org/software/bison/manual/bison.pdf [retrieved Oct. 13, 2012] [entire document].
Vern Paxson, Will Estes, and John Millaway, Lexical Analysis with Flex (Feb. 25, 2010) available at http://courses.softlab.ntua.gr/compilers/flex.pdf [retrieved Oct. 13, 2012] [entire document].
WestlawNext Quick Reference Guide. [online] [retrieved Jan. 31, 2013] http://info.legalsolutions.thomsonreuters.com/pdf/wln2/L-356012.pdf.
U.S. Appl. No. 13/584,288, Office Action of Dec. 19, 2012.
CiteGenie. [online] [retrieved Oct. 7, 2012] http://www.citegenie.com/.
CiteGenie Limitations. [online] [retrieved Oct. 7, 2012] http://www.citegenie.com/limitations.html.
Makers of Citrus. [online] [retrieved Oct. 7, 2012] https://www.correctcite.com/.
[online] [retrieved Oct. 7, 2012] http://www.google.com/url?sa=t&rct=j&q=&esrc=s&source=web&cd=6&ved=0CEsQFjAF&url=http%3A%2F%2Fcorporate.lexisnexis.com%2FCms_managed_files%2Fdocuments%2Flexis_copy_cite2.pdf&ei=8RNyULfhKurM0AGtpYGYDA&usg=AFQjCNFc89Nz_OkvL7Gz2iS06yUu66mOGw.
Zotero with Lexis and Westlaw. [online] [retrieved Oct. 7, 2012] http://lawlibraryguides.bu.edu/content.php?pid=210292&sid=1751090#5786216.
Co-Pending U.S. Appl. No. 13/584,288, filed Aug. 13, 2013 with inventor Bryant Christopher Lee. Item was previously filed in this application on Oct. 12, 2012 and is resubmitted with this IDS for purposes of clarity.

* cited by examiner

*Primary Examiner* — Sherief Badawi
*Assistant Examiner* — Christopher J Raab

(57) ABSTRACT

A method lexically analyzes and parses a citation. The method may identify errors in the citation. The method may optionally interpret and display semantic information. The method may optionally suggest corrections to errors.

20 Claims, 18 Drawing Sheets

--Code Excerpt from Lexical Analyzer Specification File--

/* Keyword and Punctuation */

```
"See"           { set_text(); return SEE; }

"v."            { set_text(); return V; }

"Ex parte"      { set_text(); return EX_PARTE; }

"In re"         { set_text(); return IN_RE; }

","             { set_text(); return COMMA; }

"("             { set_text(); return OP; }

")"             { set_text(); return CP; }

"&"             { set_text(); return AMPERSAND; }

\"              { set_text(); return DOUBLE_QUOTE; }

";"             { set_text(); return SEMICOLON; }

":"             { set_text(); return COLON; }

"-"             { set_text(); return DASH; }

"?"             { set_text(); return QUESTION_MARK; }

"in"            { set_text(); return IN; }

"/"             { set_text(); return FORWARD_SLASH; }

"*"             { set_text(); return ASTERISK; }
```

FIG. 2

--Code Excerpt from Parser Specification File--

```
/*
 * Accept a list of citation_lists (i.e. string cites),
 * separated by \n
 */
meta: meta NEWLINE citation_list
| citation_list {
};

citation_list: citation PERIOD
| citation_next citation PERIOD
| ID {
   substring(info.short_cite_form, curr_line, @1.first_column,
     @1.last_column);
 }
;

citation_next: citation SEMICOLON
| citation_next citation SEMICOLON citation: authority
;

authority: court_case
| book
| periodical
| constitution
| statute
| regulation
| short_cite
;
```

FIG. 3

--Code Excerpt from Parser Specification File-- book: opt_vol author_list COMMA institute_word_list COMMA
book_title pincite OP opt_edition NUMBER CP opt_orig_edition {
  /* This is for a standard book */
}
| opt_vol author_list COMMA book_title_nc pincite OP opt_edition
NUMBER CP opt_orig_edition {
  /*
  * book_title_nc means a book title with no commas allowed
  *
  * This rule with the above works as follows:
  * Word1, Word2      [1 is author, 2 is title]
  * Word1, Word2, Word3 [1 is author, 2 is institute, 3 is title]
  * Word1, Word2, Word3, Word4 [1 is author,
  *    2 is institute, 3 & 4 & on are title]
  */
}
| author_list COMMA article_title COMMA IN opt_vol book_title
NUMBER COMMA pincite OP opt_edition NUMBER CP opt_orig_edition{
  /* This is for work in a collection */
}
| opt_vol bare_word_list pincite OP opt_edition NUMBER CP
opt_orig_edition {
  /*
  * This is for frequently cited books as shown on pg. 135
  * of Bluebook 18th
  *
  * Example:
  * Ballentine's Law Dictionary 1190 (3d ed. 1969).
  * Black's Law Dictionary 712 (7th ed. 1999).
  * 88 C.J.S. Trial S 192 (1955).
  * 17 Am. Jur. 2D Contracts S 74 (1964).
  */
}
;

FIG. 4

--Code Excerpt from Parser Specification File-- periodical: journal
| magazine_newspaper
| manuscript
;

journal: author_list opt_des COMMA article_title COMMA NUMBER
correct_journal_name opt_spec_issue NUMBER opt_pincite OP NUMBER CP
| author_list opt_des COMMA article_title COMMA NUMBER
opt_correct_journal_name journal_word_list opt_spec_issue NUMBER
opt_pincite OP NUMBER CP {
error_wrong_name($7, @7, @8, "Unrecognized journal",
 info.journal_name, (char **) KEYWORD_JOURNALS, KJ_COLS);
}
;

magazine_newspaper: author_list COMMA article_title COMMA
magazine_newspaper_word_list COMMA term opt_day NUMBER COMMA AT
magazine_newspaper_page
| article_title_nc COMMA magazine_newspaper_word_list COMMA term
opt_day NUMBER COMMA AT magazine_newspaper_page {
}
/* Error Reporting*/
| author_list COMMA article_title COMMA magazine_newspaper_word_list
COMMA NON_KEYWORD opt_day NUMBER COMMA AT
magazine_newspaper_page {
 /* Missing Month */
 lyyerror(@7, "Unrecognized month");
}
| article_title_nc COMMA magazine_newspaper_word_list COMMA
NON_KEYWORD opt_day NUMBER COMMA AT magazine_newspaper_page {
 /* Missing Month */
lyyerror(@5, "Unrecognized month");
}
;

manuscript: author_list COMMA manuscript_title opt_pincite_nc OP term
NUMBER COMMA NUMBER CP OP free_text_word_list CP
;

FIG. 5

--Code Excerpt from Parser Specification File-- constitution: state_or_us CONST const1 const2
;

const1: ART ROMAN_NUMBER {
 }
| AMEND ROMAN_NUMBER {
}
| PMBL {
 }
;

const2: /* Empty */
| COMMA SECTION NUMBER {
 }
| COMMA SECTION NUMBER COMMA CLAUSE NUMBER {
 }
;

FIG. 6

--Code Excerpt from Parser Specification File-- statute: code_statute
| session_statute
;

session_statute: statute_title COMMA session_statute_no
number_or_range opt_session_page COMMA session_group1 {
}
;

session_group1: NUMBER SESS_AB NUMBER opt_pincite
| NUMBER SESS_AB_P NUMBER opt_pincite opt_statute_parenthetical
| NUMBER SESS_AB_PD NUMBER opt_pincite OP MONTH NUMBER COMMA
NUMBER CP
;

code_statute: opt_statute_title statute_group1
;

statute_group1: NUMBER CODE_AB_S_P SECTION s_number
opt_statute_parenthetical {
}
| CODE_A_S_P SECTION s_number opt_statute_parenthetical {
}
| CODE_A_TS_P TIT NUMBER COMMA SECTION s_number
opt_statute_parenthetical {
}
| NUMBER CODE_AB_P s_number opt_statute_parenthetical {
}
| CODE_A_A_P ART NUMBER opt_statute_parenthetical {
}
| CODE_A_AS_P ART NUMBER COMMA SECTION s_number
opt_statute_parenthetical {
}
| CODE_A_CS_P CH NUMBER COMMA SECTION s_number
opt_statute_parenthetical {
}
| CODE_A_P NUMBER opt_statute_parenthetical {
}
;

FIG. 7

--Code Excerpt from Parser Specification File-- regulation: code_reg
| register_reg
;

code_reg: opt_reg_title code_reg_group1
;

opt_reg_title: /* Empty */
| reg_title COMMA
;

reg_title: title {
}
;

code_reg_group1: NUMBER CFR SECTION reg_number OP NUMBER CP {
}
;

reg_number: NUMBER
| NUMBER PERIOD NUMBER
;

register_reg: reg_title COMMA NUMBER FED_REG register_reg_pages
register_reg_parenthetical
;

FIG. 8

--Code Excerpt from Parser Specification File--

```
short_cite: ID AT NUMBER {
}
| ID SECTION s_number {
}
| author_list COMMA SUPRA NOTE_FULL NUMBER COMMA AT pincite {
}
| NUMBER author_list COMMA SUPRA NOTE_FULL NUMBER COMMA AT pincite {
}
;
```

FIG. 9

--Code Excerpt from Parser Specification File-- court_case: reporter
| west_or_lexis_case
;

reporter: party_group COMMA reporter_group OP court_group CP
;

west_or_lexis_case: party_group COMMA NO docket_number COMMA NUMBER
e_database NUMBER COMMA AT ASTERISK NUMBER OP court_name MONTH
NUMBER COMMA NUMBER CP
;

party_group: party_word_list_n party_opt_comma V party_word_list_n
party_opt_comma party_opt_parens {
}
| EX_PARTE party_word_list_n party_opt_comma party_opt_parens {
}
| IN_RE party_word_list_n party_opt_comma party_opt_parens {
 }
;

reporter_group: NUMBER correct_reporter_name opt_rep_editor
NUMBER COMMA pincite opt_parallel_cite {
}
/*
 * Error rule
 *
 * opt_correct_reporter_name reporter_word_list
 * together are the "wrong name"
 */
| NUMBER opt_correct_reporter_name reporter_word_list opt_rep_editor
 NUMBER COMMA pincite opt_parallel_cite {
  error_wrong_name($2, @2, @3, "Unrecognized reporter",
  info.reporter_name, (char **) KEYWORD_REPORTERS, KR_COLS);
 }
;

FIG. 10

Web Page Title ⟵ 1401

The citation entered was:

A, Title, 10 Harv. L. s 10 (1990).
                1402      1403

Errors:
(1) 14 – 25: Unrecognized journal. Did you mean "Harv. L. Rev."

1404

Citation Interpretation:

Citation type: Article
Author names: A
Article title: Title
Journal name: Harv. L. s
Journal volume: 10
Journal page: 10
Year: 1990

METHOD AND SYSTEM FOR CHECKING CITATIONS

CROSS-REFERENCES TO RELATED APPLICATIONS

This application claims priority from U.S. provisional patent application Ser. No. 61/573,446 filed Sep. 6, 2011, which is hereby incorporated by reference.

REFERENCE TO COMPUTER PROGRAM LISTING SUBMITTED ON A COMPACT DISC

This application hereby incorporates by reference a computer program listing appendix on compact disc (CD) as filed with the application. The computer program listing appendix contains source code listings of instructions that when executed by, for example, a computer cause the computer to perform aspects of one or more embodiments described herein. The computer program listing appendix comprises all files on the two identical copies of the one CD (labeled "Copy 1" and "Copy 2") filed with the application. The files on the CD are listed in the Transmittal Sheet for Submission of Compact Discs along with their size and creation date and compatibility information. The files on the CD are subject to copyright protection. The portions of the code presented in the specification and drawings are also subject to copyright protection. The copyright owner has no objection to the reproduction, copying, or printing of the copyrighted material by the U.S. Patent and Trademark Office. Otherwise all copyright rights are reserved.

The files on the CD are compatible with IBM-PC and MS-Windows. All files on the CD are incorporated by reference herein. The files are listed below:

| File Name | Size (KB) | Date Created |
|---|---|---|
| Top level directory | | |
| helper_scripts [folder] | [folder] | 10/25/2011 |
| bc.1 | 37 | 10/25/2011 |
| bc.y | 67 | 10/25/2011 |
| bc_keywords.h | 27 | 10/25/2011 |
| Makefile | 1 | 10/25/2011 |
| test1.full | 5 | 10/25/2011 |
| test1.txt | 2 | 10/25/2011 |
| test2.full | 7 | 10/25/2011 |
| test2.txt | 4 | 10/25/2011 |
| test3.full | 4 | 10/25/2011 |
| test3.txt | 2 | 10/25/2011 |
| test4.full | 1 | 10/25/2011 |
| test4.txt | 1 | 10/25/2011 |
| test5.full | 2 | 10/25/2011 |
| test5.txt | 1 | 10/25/2011 |
| test6.full | 7 | 10/25/2011 |
| test6.txt | 2 | 10/25/2011 |
| test7.full | 3 | 10/25/2011 |
| test7.txt | 1 | 10/25/2011 |
| test8.full | 6 | 10/25/2011 |
| test8.txt | 3 | 10/25/2011 |
| test9.full | 4 | 10/25/2011 |
| test9.txt | 2 | 10/25/2011 |
| test10.full | 3 | 10/25/2011 |
| test10.txt | 1 | 10/25/2011 |
| test11.full | 6 | 10/25/2011 |
| test11.txt | 2 | 10/25/2011 |
| test-all | 2 | 10/25/2011 |
| helper_scripts directory | | |
| codes.keywords_input | 7 | 9/4/2011 |
| codes.keywords_input_unexpanded | 2 | 9/4/2011 |
| codes.keywords_output | 7 | 9/4/2011 |
| expand-macros | 5 | 9/4/2011 |
| generate-keyword-array | 3 | 9/4/2011 |
| journals.keywords_input | 15 | 9/4/2011 |
| journals. keywords_output | 15 | 9/4/2011 |
| reporters.keywords_input | 4 | 9/4/2011 |
| reporters.keywords_output | 4 | 9/4/2011 |
| sessions. keywords_input | 3 | 9/4/2011 |
| sessions.keywords_output | 3 | 9/4/2011 |

BACKGROUND OF THE INVENTION

1. Field of the Invention

The invention relates generally to techniques for lexical analysis and parsing. More specifically, it relates to techniques for lexical analysis and parsing of citations and legal citations.

2. Description of Related Art

Lexical analyzers and parsers are often used to compile computer source code into assembly language and binary code. The lexical analyzer divides computer source code into tokens, and the parser identifies relationships between the tokens representing source code.

Lexical analyzers have been used to divide input sequences into tokens. Some lexical analyzers are built using lexical analyzer generators. Lexical analyzers can be specified to accept regular languages. They may execute action code when a regular expression is matched. A lexical analyzer may be used with a parser.

Parsers have been used to identify relationships between tokens. Some parsers are built using parser generators. Parsers can be specified to accept context-free grammars. They may execute action code when a production rule is matched.

The Internet is a system of interconnected computer networks, which allows computer systems on the Internet to communicate with each other. Computers may communicate according to certain services such as electronic mail and the World Wide Web (WWW or "the web"). The WWW service is a system of interlinked hypertext documents. Documents on the web can be viewed with web browsers. Web pages, text, images, videos, and other multimedia are all types of media that can be accessed in a web browser. To view a document on the web, a client computer would usually send a request to a web server that is hosting web content. The client computer may identify the requested resource using an identifier such as a Uniform Resource Locator (URL). The web server would respond to the request by sending the appropriate document to the client computer. The client computer can display the document in a web browser. Web pages can be specified in many formats and languages. Sometimes, the web pages may include scripts, which are executable code. Web pages may also be backed by a database. Access to a web page may cause code to be executed on the web server and may cause accesses to a database. Web applications may also be Rich Internet Applications (RIAs) that operate on a software platform such as Flash or Silverlight. An RIA may require installation of the software platform on the client computer, for example by browser plug-in, in order to function.

SUMMARY OF THE INVENTION

An embodiment of the invention relates to lexically analyzing and parsing a citation. The embodiment may identify errors in the citation. The embodiment may optionally interpret and display semantic information. The embodiment may optionally suggest corrections to errors.

An embodiment of the invention relates to lexically analyzing and parsing a citation. The embodiment may identify errors in the citation. The embodiment may optionally interpret and display semantic information. The embodiment may optionally suggest corrections to errors. The lexical analyzer may accept a regular language. The parser may accept a context-free grammar.

An embodiment of the invention relates to lexically analyzing and parsing a citation. The embodiment may identify errors in the citation. The embodiment may optionally interpret and display semantic information. The embodiment may optionally suggest corrections to errors. A user submits a citation through a web form hosted on a computer server. The citation is input into a processing computer program with an optional pre-processor, a lexical analyzer, a parser, and an optional post-processor. An output webpage is produced that identifies errors in the citation, interprets the semantic information of the citation, and may suggest corrections to the errors.

An embodiment of the invention relates to lexically analyzing and parsing citations. The embodiment may identify errors in the citations. The embodiment may optionally interpret and display semantic information. The embodiment may optionally suggest corrections to errors. A computer program comprising an optional pre-processor, a lexical analyzer, a parser, and an optional post-processor takes as input a document. The document is processed to identify text strings that are likely to be citations. The citations are processed by a lexical analyzer and parser to identify errors, optionally interpreting semantic information, and optionally outputting suggestions for correcting the errors.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a sample code listing excerpted from the lexical analyzer specification code of an embodiment showing rules for matching tokens.

FIG. 3 is a sample code listing excerpted from the parser specification code of an embodiment showing rules for accepting lists of citations.

FIG. 4 is a sample code listing excerpted from the parser specification code of an embodiment showing code relating to book citations.

FIG. 5 is a sample code listing excerpted from the parser specification code of an embodiment showing code relating to periodical citations.

FIG. 6 is a sample code listing excerpted from the parser specification code of an embodiment showing code relating to constitutions.

FIG. 7 is a sample code listing excerpted from the parser specification code of an embodiment showing code relating to statutes.

FIG. 8 is a sample code listing excerpted from the parser specification code of an embodiment showing code relating to regulations.

FIG. 9 is a sample code listing excerpted from the parser specification code of an embodiment showing code relating to short citations.

FIG. 10 is a sample code listing excerpted from the parser specification code of an embodiment showing code relating to court cases.

FIG. 14 shows an exemplary output page of an embodiment.

DETAILED DESCRIPTION

Figure 1:
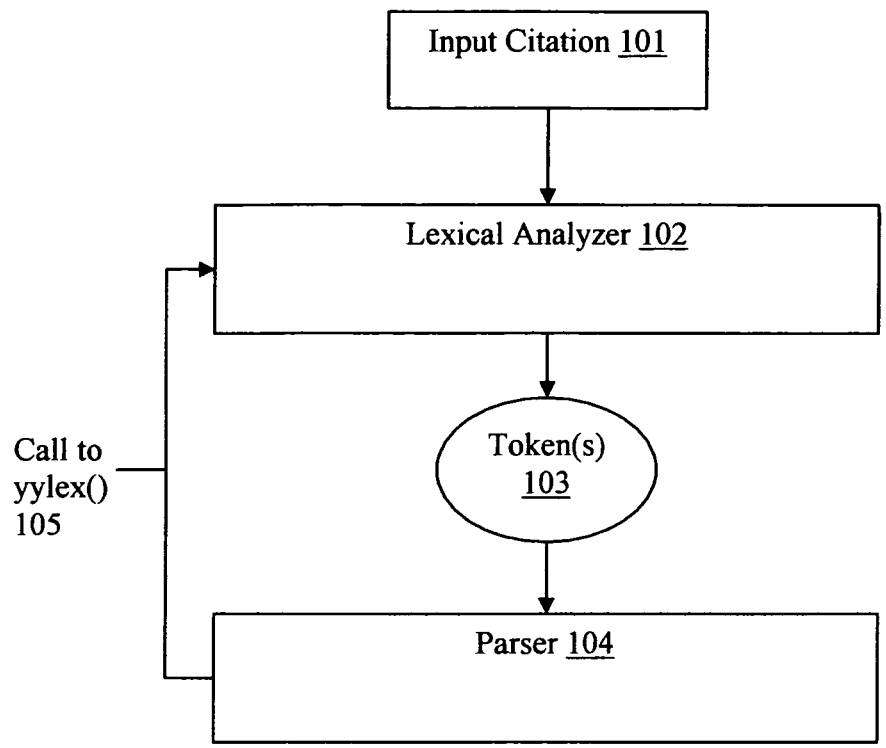
FIG. 1 illustrates an example software architecture involving a lexical analyzer and a parser.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by the claims. The following embodiments of the invention are set forth without any loss of generality to, and without imposing limitations on, the invention. In the following description, specific details are set forth in order to provide a thorough understanding of the present invention. The present invention may be practiced without some or all of these specific details. In addition, well known features may not have been described in detail to avoid unnecessarily obscuring the invention. In addition, it should be understood that steps of a method can be performed in different orders than the order presented in this specification.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes multiple computers. The term computer system includes multiple computer systems. The term computer server includes multiple computer servers. The term computer-readable medium includes multiple computer-readable media.

Embodiments of the invention may comprise one or more computers. Embodiments of the invention may comprise software and/or hardware. Some embodiments of the invention are software only and may reside on hardware. A computer may be special-purpose or general purpose. A computer is defined to include personal computers, desktop computers, laptop computers, mobile devices, cellular phones, smart phones, PDAs, pagers, multi-processor systems, microprocessor-based or programmable consumer electronics, cloud computers, tablets, minicomputers, mainframe computers, and the like. Embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is media that can be accessed by a computer. Examples of computer-readable media include, but are not limited to, RAM, ROM, hard disks, flash memory, DVDs, CDs, magnetic tape, and floppy disks.

Computer-executable instructions comprise, for example, instructions and optional data which cause a computer to perform a function or group of functions. Computer executable instructions may be binaries, intermediate format instructions such as assembly language, source code, and the like.

A network is one or more data links that enable the transport of electronic data. Networks can connect computer systems.

1. Lexical Analyzer

Broadly speaking, a lexical analyzer is a program that divides input into meaningful chunks, called tokens. A lexical analyzer is often used with a parser. In that case, the tokens would be passed to the parser so that the parser could identify relationships between the tokens. Using the relationships between tokens, the parser may perform computations to obtain some result.

A lexical analyzer is said to perform lexical analysis. Lexical analysis is also called lexing or scanning. Therefore, a lexical analyzer can also be called a lexer or a scanner.

A lexical analyzer generally operates by identifying patterns of characters in the input and treating certain identified patterns as tokens. Typically, patterns of characters are identified using regular expressions. The regular expressions may describe a regular language. A programmer might specify patterns of characters using a regular expression package for his programming language or system, but it would also be possible to specify patterns of characters by hand, such as by using IF/ELSE statements or case statements or other methods. When the lexical analyzer identifies a set of characters of the input that matches one of its specified regular expressions, it could perform a specified action and/or return a token. In some cases, the lexical analyzer may identify a set of characters of the input that matches one of its specified regular expressions and then do nothing, for example if the lexical analyzer wanted to ignore certain characters such as white space.

An action is often specified using computer code. For instance, an action might be specified using a block of code or a function. Actions can include performing computations, performing I/O, calling functions, making system calls, or other actions that can be specified using computer code.

A lexical analyzer can be made by hand. A programmer could code a lexical analyzer from scratch and specify code to match input against regular expressions, perform actions, and return tokens. It is also very common for a lexical analyzer to be created using a lexical analyzer generator. A lexical analyzer generator is a computer program that outputs a lexical analyzer. The lexical analyzer generator typically makes the job of creating a lexical analyzer much easier.

To use a lexical analyzer generator, one would usually create a lexical analyzer specification file that specified the behavior of a desired lexical analyzer. The lexical analyzer specification file would usually include a set of regular expressions paired with any associated actions and return values. The lexical analyzer specification file may also contain a set of definitions for use by the lexical analyzer. It may also contain functions and other code that could be placed into the lexical analyzer. From the lexical analyzer specification file, the lexical analyzer generator can generate a lexical analyzer.

The internal form of a lexical analyzer created using a lexical analyzer generator is usually a deterministic finite automata (DFA). A DFA can quickly match strings of input against regular expressions.

Examples of lexical analyzer generators include Lex and Flex. Other lexical analyzer generators include JLex, Quex, and Ragel. A lexical analyzer and lexical analyzer generators can be written in just about any computer programming language, including but not limited to C, C++, C#, Java, Ruby, PHP, Perl, Smalltalk, Basic, Pascal, and Fortran.

In some cases, a lexical analyzer can be part of a parser. In that case, the lexical analyzer is a module of the parser or code in the parser that identifies tokens that are used by the parsing code of the parser.

2. Parser

Broadly speaking, a parser is a program that takes tokens as input and identifies the relationship between tokens. It may compute a result in response to receiving tokens and identifying relationships between tokens.

A parser may be specified to accept a context free grammar (CFG). A CFG can be specified using Backus-Naur Form (BNF). BNF specifies how to turn a sequence of tokens into a parse tree. A parse tree can be a data structure, but it can also be implicit in the order of computations performed.

In BNF, there are symbols. A symbol can be a non-terminal symbol or a terminal symbol. A token is a kind of terminal symbol. A CFG specified using BNF comprises a set of rules for reducing a sequence of symbols into other symbols. A rule has a left-hand side and a right-hand side. A symbol on the left-hand side of a rule can be expanded into the sequence of symbols on the right-hand side. Similarly, when a sequence of symbols matches the right-hand side of a rule, the sequence of symbols can be reduced to the left-hand side symbol of the rule. The rules are called production rules.

A parser takes tokens as input and applies its internal rules to the tokens. The internal rules can comprise a CFG. Each rule can be paired with a specified action. The action can be performed when the rule is matched. An action is often specified using computer code. For instance, an action might be specified using a block of code or a function. Actions can include performing computations, performing I/O, calling functions, making system calls, or other actions that can be specified using computer code. In some cases, the action may include returning a value.

Sometimes, a parser may build a data structure called a parse tree. The parse tree can represent in tree form the sequence of rule reductions performed by the parser. Sometimes, a parser may build an abstract syntax tree (AST). An AST is a data structure like a parse tree, but omits nodes for rules that are uninteresting or collateral.

A parser may employ a top-down parsing strategy. In this case, the parser starts with a start symbol and applies the production rules until it arrives at the input string. An LL parser is a type of parser that uses the top down strategy. An LL parser parses the input from left to right and produces a leftmost derivation.

Top-down parsers may employ backtracking. The top-down parser may attempt to develop the parse tree using certain rules and then backtrack if it reaches a dead end. Also, a top-down parser may employ predictive parsing. In predictive parsing, the parser can determine which production rule to apply by using a finite amount of lookahead.

A parser may employ a bottom-up parsing strategy. In this case, the parser starts with the input string and reduces it to the start symbol. An LR parser is a type of parser that uses the bottom up strategy. An LR parser parses the input from left to right and produces a rightmost derivation. Subclasses of the LR parser include LR(k) parsers, which are LR parsers with k symbols of lookahead; SLR(k) parsers, which are Simple LR parsers with k symbols of lookahead; LALR(k) parsers, which are Look-Ahead LR parsers with k symbols of lookahead; and GLR parsers, which is a Generalized LR parser.

Bottom-up parsers may use a shift/reduce parsing technique. In this technique, the parser reads tokens and shifts them on to an internal stack. When symbols on the stack constitute the right-hand side of a rule, the symbols are popped off the stack and the left-hand side symbol is shifted on to the stack. The parser may include a set of states to help it keep track of its position in partially parsed rules.

A parser can be made by hand. A programmer could code a parser from scratch and specify code to match input against production rules and perform actions. It is also very common for a parser to be created using a parser generator. A parser generator is a computer program that outputs a parser. The parser generator typically makes the job of creating a parser much easier.

To use a parser generator, one would usually create a parser specification file that specified the behavior of a desired parser. The parser specification file would usually include a set of production rules paired with associated actions and return values. The parser specification file may also contain a set of definitions for use by the parser. It may also contain functions and other code that could be placed into the parser. The parser generator can create a parser by using the parser specification file.

Examples of parser generators include Yacc and Bison. Other parser generators include Jison, DParser, and SPARK. A parser and parser generators can be written in just about any computer programming language, including but not limited to C, C++, C#, Java, Ruby, PHP, Perl, Smalltalk, Basic, Pascal, and Fortran.

In some cases, a parser can include a lexical analyzer. The lexical analyzer can be built into the code of the parser and provide tokens to the parsing code of the parser.

Because no use of statistics or probabilities or fuzzy logic is required, the output of a lexical analyzer and parser can be deterministic.

3. Lexical Analysis and Parsing Applied to Legal Citations

A computer program or programs may use lexical analysis and parsing to determine whether a legal citation is in proper format. Proper format can include syntactical correctness and semantic correctness. If the citation is not in the right format, the error in the citation may be identified. The error may be identified by what type of error it is and by the location of the error, such as a line and column number or line and column range. The program may also output a suggested solution to the error.

If the citation is correct, the program may output an indication that the citation is in correct format.

Furthermore, in some embodiments, the citation may be interpreted so that the semantic information that it encodes can be outputted. For example, if the citation is for a court case, then the name of the case, the year of the case, the court name, the reporter name, and the volume and page number of the reporter can all be identified and outputted. This information may be useful to a user who is uncertain of how to interpret certain citation formats. In some embodiments, the computer program may be able to determine what type of reference a citation refers to in the first place, such as whether the reference is a court case, statute, regulation, article, or constitution.

The term "legal citation" includes citations used in a legal memo, brief, court filing, legislative document, court opinion, court order, legal scholarship, and the like. Legal citations are used to support legal arguments. Legal citations refer to a reference. References may be court cases, statutes, regulations, government documents, treaties, scholarly writing, electronic materials, materials from a database, and other materials. There are several systems of legal citation in existence such as the Bluebook, ALWD citation manual, and the Maroonbook. Also, many courts have their own system of legal citation, which may be specified in the courts' local rules.

Lexical analysis and parsing may be applied to ensure conformity with any system of legal citation, whether it be set forth in a book such as the Bluebook, ALWD citation manual, or Maroonbook, or whether it be set forth by a court, legislature, or other government body.

A citation to multiple references in sequence is referred to in this patent as a string citation or string cite.

In some cases, it is useful for the parser grammar and/or the lexical analyzer to be able to match incorrect citation formats. By creating rules to match an incorrect format, the error can be recognized by the program and an appropriate error message can be displayed. These rules that match incorrect formats are a form of error rule. To avoid creating an ambiguity between an error rule and a correct rule, one might use precedence rules or in the case of a GLR parser, % dprec or % merge in Bison.

In other cases, when an input sequence does not match the rules of the grammar specified by the parser, then the parser can output an appropriate error.

To catch semantic errors, one might include action code that interprets the semantic information of a citation and determines whether the semantic information is correct or not.

Some embodiments of the invention could be implemented using parallel programming. Code in the lexical analyzer and parser could be parallelized.

4. One Embodiment

In this section, one embodiment of the invention is set forth. The descriptions of this embodiment should not be taken to limit the invention. The invention can operate according to broader principles disclosed in this patent, even if such principles may not be present in this embodiment. The invention can include aspects that may not be present in this embodiment. The invention may be practiced without some or all the details of this embodiment.

In the embodiment, a lexical analyzer and parser are used to determine whether a legal citation conforms to proper legal citation format. In this embodiment, the legal citation format used is the Bluebook produced by the Columbia Law Review, Harvard Law Review, University of Pennsylvania Law Review, and the Yale Law Journal. The Bluebook is currently on its nineteenth edition, and this embodiment aims to conform to that edition. This embodiment was originally developed with respect to the eighteenth edition, but the nineteenth edition is similar.

Several examples of Bluebook format are given herein:
1. Meritor Say. Bank v. Vinson, 477 U.S. 57, 60 (1986). This is a court case. (1) The text before the first comma specifies the parties; (2) following number is the reporter volume; (3) following text is the reporter abbreviation; (4) following number is the first page of the case; (5) following number is the cited page of the case; (6) following is the year in parenthesis.
2. U.S. Const. amend. XIV, §2. This is a citation to the Constitution. (1) The initial text specifies that it is a citation to the Constitution; (2) following text specifies that it is a citation to an amendment; (3) following text specifies which amendment is cited; (4) following text specifies what section of the amendment is cited.
3. Comprehensive Environmental Response, Compensation, and Liability Act, 42 U.S.C. §§9601-9675 (2006). This is a citation to a statute. (1) The initial text provides the name of the statute; (2) following is the U.S.C. title number; (3) following is the abbreviation of the code cited; (4) following is the sections of the title cited; (5) following is the year in parenthesis.
4. Charles A. Reich, The New Property, 73 Yale L. J. 733, 737-38 (1964). This is a citation to a law review article. (1) The initial text is the author name; (2) following is the title of the article; (3) following is the journal volume number; (4) following is the abbreviation of the journal; (5) following is the first page of the article; (6) following is the cited page range of the article; (7) following is the year of the article.

The above are just examples. Many more citation formats exist in the Bluebook. The Bluebook contains numerous rules about citation format.

In this embodiment, the lexical analyzer is made with Lex and the parser is made with Bison. Therefore, the lexical analyzer is described using code in a format suitable for a Lex input file, and the parser is described using code in a format suitable for a Bison input file. In this embodiment, the code for the lexical analyzer is specified in a lexical analyzer specification file, and the code for the parser is specified in a parser specification file. Through processing by Lex, Bison, and a compiler, these files are compiled to produce a single executable file, comprising both the lexical analyzer and the parser. In other embodiments, the lexical analyzer and parser could be in separate executable files.

In this embodiment, the parser operates according to shift/reduce parsing. Even more specifically, it implements a GLR parser. The embodiment uses the % glr-parser declaration in Bison. For grammars with no unresolved conflicts, the GLR parser operates identically to LR(k) parsers. However, if there is an unresolved shift/reduce or reduce/reduce conflict, the GLR parser follows both possibilities by effectively cloning the parser. Each of the resulting parsers can again split, so that additional paths can be followed. The parsers proceed in lockstep so that all of them consume an input symbol before any proceed to the next. Each cloned parser eventually reaches one of two outcomes: it runs into a parsing error, in which case it vanishes, or it merges with another parser because the two of them have reduced the input to an identical set of symbols. When there are multiple parsers active, semantic actions are recorded and are not performed. When a parser disappears, for example due to a parse error, its recorded actions are discarded and are never performed. When parsers merge, both sets of actions are recorded. When the last two parsers merge, either the outstanding actions are resolved by precedences of the grammar rules involved, or if not, then both sets of actions are performed and there is an optional call to a user-defined function on the resulting values to produce a merged result.

Other embodiments may use different parsing strategies such as LL or LR(k).

The code shown in this textual specification and drawings are excerpts. These excerpts may be modified from their original form in the computer program listing appendix on CD filed with this application, for the purpose of providing high level explanations or details. More complete code is present in the computer program listing appendix on CD filed with this application. The code in the computer program listing appendix on CD is exemplary only. Additional features described in this specification might not be implemented by the code in the computer program listing appendix on CD.

FIG. 1 illustrates an example architecture of the embodiment. The parser 104 calls the function yylex( ) 105, which causes the lexical analyzer 102 to read part of the input citation 101 and perform any appropriate actions based on the input. The lexical analyzer 102 returns one or more tokens 103 to the parser 104. In lexical analyzers and parsers created by Lex and Bison, generally a single token is returned. The lexical analyzer 102 may set the value of variables to be used by the parser 104.

FIG. 2 is a sample code listing excerpted from the lexical analyzer specification code of this embodiment. As may be seen, the lexical analyzer recognizes certain character sequences that have special significance in legal citations such as "See", "v.", "Ex parte", and "In re". It also recognizes certain common punctuation symbols, which may appear in some legal citations. The function set_text( ) is called as an action when some of the regular expressions are matched. This function sets the value of variable yylval to a string containing the sequence of tokens that matched the expression. The variable yylval is accessible by the parser. The action code of the regular expressions may also return an appropriate token.

FIG. 3 is a sample code listing excerpted from the parser specification code of this embodiment. The code specifies part of the grammar recognized by the parser. In the excerpts listed in this textual specification and drawings, the code is shown with much of the action code removed for additional instructive clarity. Much of the error recovery code is removed as well. More complete code is present in the computer program listing appendix on CD filed with this application.

As shown in FIG. 3, in this embodiment, the starting symbol is called meta, and it matches a set of citation_list symbols separated by new lines. The citation_list symbol matches a string citation, namely a list of citations separated by semicolons and ending with a period. Citations can be of many different types of authority such as court cases, books, periodicals, constitutions, statutes, regulations, and short cites.

The function substring( ) is used to copy a substring of its second parameter to the destination string specified by its first parameter. It is often used in this embodiment to copy a sequence of characters from the input into a struct called "info", where the info struct is used to collect semantic information from the citation so that the information may be displayed to the user. In the code listing of FIG. 3, it is used in this way.

FIG. 4 is a sample code listing excerpted from the parser specification code of this embodiment. It shows the grammar rule specifying the format of book citations. The rule shows four alternative formats for a book citation. The first listed format is a standard book format with a list of authors' names, an institutional affiliation of the authors, and the book title, as well as other information. The second listed format is the standard book format, except without an institutional affiliation. In this second format, the book title is required not to have commas in it, for otherwise it would create an ambiguity with the first format where certain sequences of characters could either be an institution name or part of the book title. These two formats show a design choice where any material between a first and second comma in a book citation is assumed to be an institution name. Other design choices are possible such as instead assuming that material between a first and second comma in a book citation is part of the book title. Another choice would be for the parser to read and semantically interpret material between the first and second comma in a book citation and decide whether it was more likely an institution or part of a book title. For example, the parser could match the material against known institution names.

In FIG. 4, the third book format is for works in a collection. The fourth book format is for frequently cited books.

Also, as a general rule in this embodiment, symbols with the prefix "opt" tend to be those that allow for optional insertion of characters into a citation. Symbols with this prefix generally have rules that match both the empty string and a sequence of symbols.

FIG. 5 is a sample code listing excerpted from the parser specification code of this embodiment. It shows code relating to periodical citations, such as citations to journal articles, magazine articles, newspaper articles, and unpublished manuscripts. The production rule of journal articles has a single correct form, that is listed first, and a second incorrect form that is an error rule. The lexical analyzer includes a list of correct journal names, and a correct journal name is included in the first production. The error rule matches instances where the input citation has an unrecognized journal name. In its action code, the error rule identifies the closest correct journal name according to the edit distance and outputs it as a suggested correction.

In FIG. 5, the code handles citations to magazines and newspapers, which have a similar citation format. The first listed format for magazines and newspapers handles situations where the citation includes authors' names. The second listed format handles situations where the citation does not include authors' names. In the second format, the article title is not allowed to have commas because a comma would create an ambiguity over whether the material before the comma was a list of authors' names or part of the article title. This was a design choice. In another embodiment, the parser could semantically analyze material before the first comma in a magazine or newspaper citation to make an educated guess about whether the materials was a list of authors' names or part of the article title. The rule for magazines and newspapers also has two error productions. These error productions match citations where there is an incorrect abbreviation for a month in the citation.

In FIG. 5, there is also code to handle citations to an unpublished manuscript.

FIG. 6 is a sample code listing excerpted from the parser specification code of this embodiment. It shows code relating to constitutions. The rule for constitutions matches state constitutions and the United States Constitution. Other embodiments could match foreign constitutions.

FIG. 7 is a sample code listing excerpted from the parser specification code of this embodiment. It shows code relating to statutes. The statutes matched can be either citations to a code or citations to a session law. As may be seen in the figure, citations to a code and citations to a session law are in different formats. The embodiment handles state statutes and federal statutes. Because of the variety of citation formats for state statutes, a variety of production rules are used. The lexical analyzer recognizes tokens that identify which state the statute is from. It then returns the appropriate token so that parser may apply the correct format. The tokens are given an appropriate name for human readability. For example, return of the token CODE_AB_S_S_P means that the parser should match a code abbreviation with a number both before ("B") and after ("A") and with a section symbol and number ("S") and with a year in parenthesis ("P"). An explanation of how to interpret the token names is given in the lexical analyzer specification code in the computer program listing appendix on CD.

FIG. 8 is a sample code listing excerpted from the parser specification code of this embodiment. It shows code relating to regulations. The code matches citations to the Code of Federal Regulations and the Federal Register.

FIG. 9 is a sample code listing excerpted from the parser specification code of this embodiment. It shows code relating to short citations. The rules match short citation forms such as those using id. and supra.

FIG. 10 is a sample code listing excerpted from the parser specification code of this embodiment. It shows code relating to court cases. The rules match citations to a reporter as well as citations to the Westlaw or Lexis electronic database. The rules check to ensure that the case name is in the format A v. B, or alternatively Ex parte C or In re D. The rules also check to ensure that the reporter name is a correct reporter name, otherwise an error rule will output the closest correct reporter name according to the edit distance.

6. Detecting Additional Errors

It may be desirable to catch even more errors in legal citations than those caught by the embodiment presented in the computer program listing appendix on CD filed with this application.

Some errors that could be detected by embodiments of the invention are listed in the table below, along with techniques for detecting those errors in legal citations. Other techniques for detecting the errors are also possible. The proposed techniques should be viewed as only one possible way of detecting the error.

Some errors that can be detected are semantic errors. In semantic errors, the syntactic format of the citation is correct, but the semantic information of the citation makes it incorrect.

Some errors that can be detected are syntax errors. In syntax errors, the syntactic format of the citation is incorrect.

The errors listed in the table below are just examples. It may be desirable to catch additional errors besides those listed below. Extrapolation from the information listed below, this specification, and the computer program listing appendix on CD filed with this application would allow arriving at appropriate techniques to catch additional errors.

| Error | How to detect the error |
| --- | --- |
| Semantic Errors | |
| For a court case, the court name and the reporter are mismatched. Reporters only include cases from certain courts. If the input citation includes a reporter that does not include citations from the cited court, then this may be an error. | In the parser, in the action code for a production rule matching a court case, code may identify both the court name and the reporter. The code could look up in a table, tree, or other data structure whether the reporter and the court name can appear in the same citation. If they cannot, an error can be thrown. |
| For a court case, a word in the party name should be abbreviated. In the Bluebook, certain words in party names are abbreviated. | In the parser, in the action code for a production rule matching a court case, code may iterate through the words of the party name. Each word may be looked up in a table, tree, or other data structure that associates a certain word to its abbreviation (if an abbreviation exists). During the iteration, if a word is found that should be abbreviated, then the code may output an error message suggesting the correct abbreviation. |
| For a court case, an abbreviation in the party name is incorrect. | In the parser, in the action code for a production rule matching a court case, code may iterate through the words of the party name. Each abbreviation found in the party name may be looked up in table, tree, or other data structure that contains all correct abbreviations. If the abbreviation is not found, it is incorrect. |
| For a court case, the court name is incorrect. | In the parser, in the action code for a production rule matching a court case, code may identify the court name and then compare the court name against a table or other data structure containing all correct court names. If the court name is not found, then it is incorrect. |
| For various citations, sometimes the word "and" should instead be abbreviated "&". | In the parser, in action code of a production rule, the code may identify all instances of "and" and if the citation format requires an "&" then an error can be output. For example, in a list of authors an "and" should be written "&". |
| In a string cite, the order of authorities is incorrect. | In the parser, action code may identify the citation type of each citation in a string cite. The action code may then identify if citations are incorrectly ordered because of the citation types (for example, cases should be cited before books). Also, action code may determine whether citations of the same type are incorrectly ordered. For example, cases from the same court are ordered by year, while books are ordered by author name. Information such as year of a court case and names of authors may be stored in variables during parsing. |
| In a string cite, the order of signals is incorrect. | In the parser, action code may determine what signal is used because of what token was returned or by the setting of a variable. If signals are in the wrong order, then an error can be output. |
| In a parenthetical, the first letter is incorrectly made upper case or a quoted sentence is incorrectly started with a lower case letter. | In the parser, action code for a rule involving a parenthetical may identify the first letter in the parenthetical and determine if it is upper case or lower case. If there are no quotes, the first letter should be lower case. If there is a quoted sentence, the first letter should be upper case. Otherwise, an error is output. |
| In a title, for example of a book, the title is not capitalized according to Bluebook rule 8(a) ($19^{th}$ edition). | In the parser, action code for a rule involving a title may iterate through the words of the title and determine which ones should be capitalized according to code implementing Bluebook rule 8(a). |
| In a page range involving numbers with three digits or more, the ending number of the range is incorrectly given with more than two digits. | In the parser, action code for a rule involving a page range may determine whether the ending number of a range should be given with two digits instead. |
| In a page range, the ending number of the | In the parser, action code for a rule |

-continued

| Error | How to detect the error |
|---|---|
| range is before the beginning number of the range. | involving a page range may determine the beginning and ending numbers of the range and determine if the ending number comes before the beginning number. |
| Syntax Errors | |
| Syntax errors are generally automatically caught by the parser and an error will be thrown. However, it may be useful in some cases to include a specific error rule for certain syntax errors so that a more useful error message can be thrown. | |
| Missing pincite. | An error rule matches a citation missing a pincite. |
| Wrong order of elements of a citation, such as a court name before the reporter name. | An error rule matches the wrong order of elements. |
| Missing information, such as a missing reporter name. | An error rule matches a citation missing the information. |
| Wrong format for not commonly used citations. For example, the user may make an incorrect citation for infra or subsequent history or weight of authority, because these may not be commonly used and hence the user may be unfamiliar with the correct format. | An error rule matches common incorrect formats for not commonly used citations. |

Figure 11:
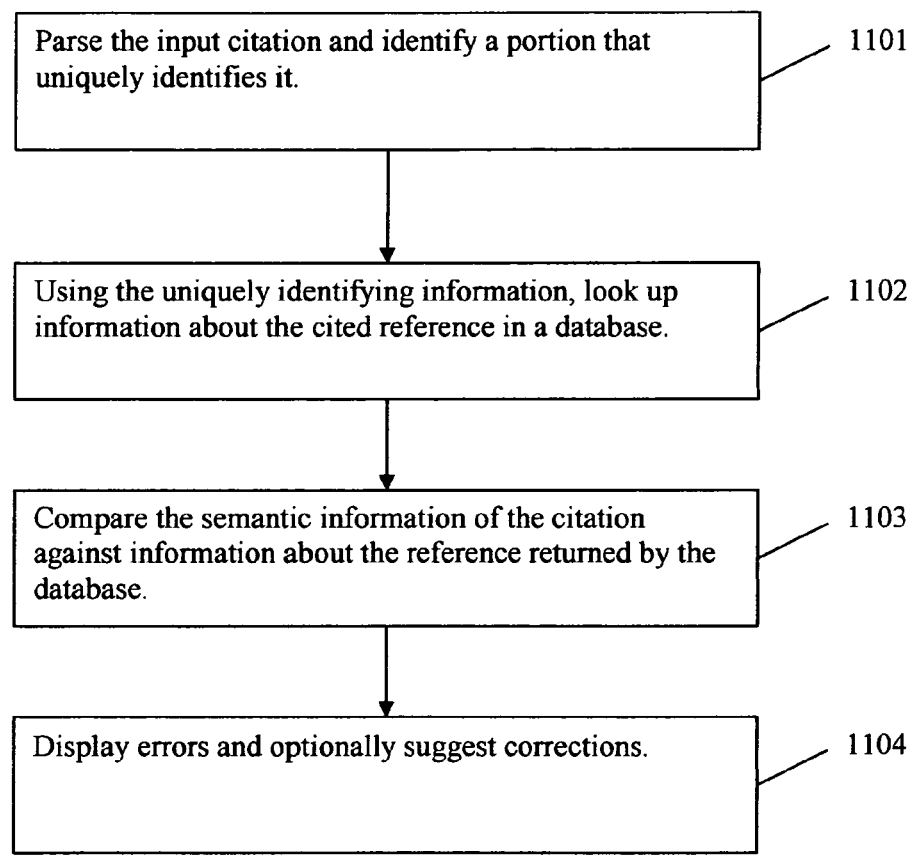
FIG. 11 is a flow chart of an exemplary optional method for identifying errors in a citation.

Some additional semantic errors can be caught with the following optional technique, as shown in FIG. 11: In the first step, the parser identifies a part of the citation that uniquely identifies it (step 1101). For a case, this could be the reporter name, the reporter volume, and the reporter page number. In the second step, the parser looks up information about the reference in a database (step 1102). The database stores information about references, and this information is retrievable by providing unique identifying information of a reference, such as the reporter name, reporter volume, and the reporter page number. Some databases provided by Westlaw and Lexis are of this type. In the third step, the parser compares the semantic information in the input citation against the correct information for the reference as returned by the database (step 1103). For example, the parser can check to see if the case name, court name, and year provided in the input citation are correct by comparing them against information provided by the database. In the fourth step, errors can be displayed and suggested corrections can be output (step 1104).

7. Embodiments of the Software Architecture

Exemplary embodiments of software architecture are given below. A wide variety of user interfaces can be used with embodiments of the invention. Also, there are many possible ways of receiving the input legal citation. The input legal citation may be a single citation. The input legal citation may be a string citation. The input legal citation may be a list of citations or string citations. The input legal citation may be received embedded in a legal document. In that case, the document may be processed to identify any legal citations in it and to check the legal citations for errors and possibly output suggested corrections. In some cases, batch processing may be used, for example to handle many legal citations or many legal documents.

In some cases, the invention may be used in a networked environment. In some cases, the invention may be used on a single computer that is not networked.

It would be impossible to list all possible embodiments of the invention. The embodiments listed here are exemplary.

Embodiment 1

Figure 12:
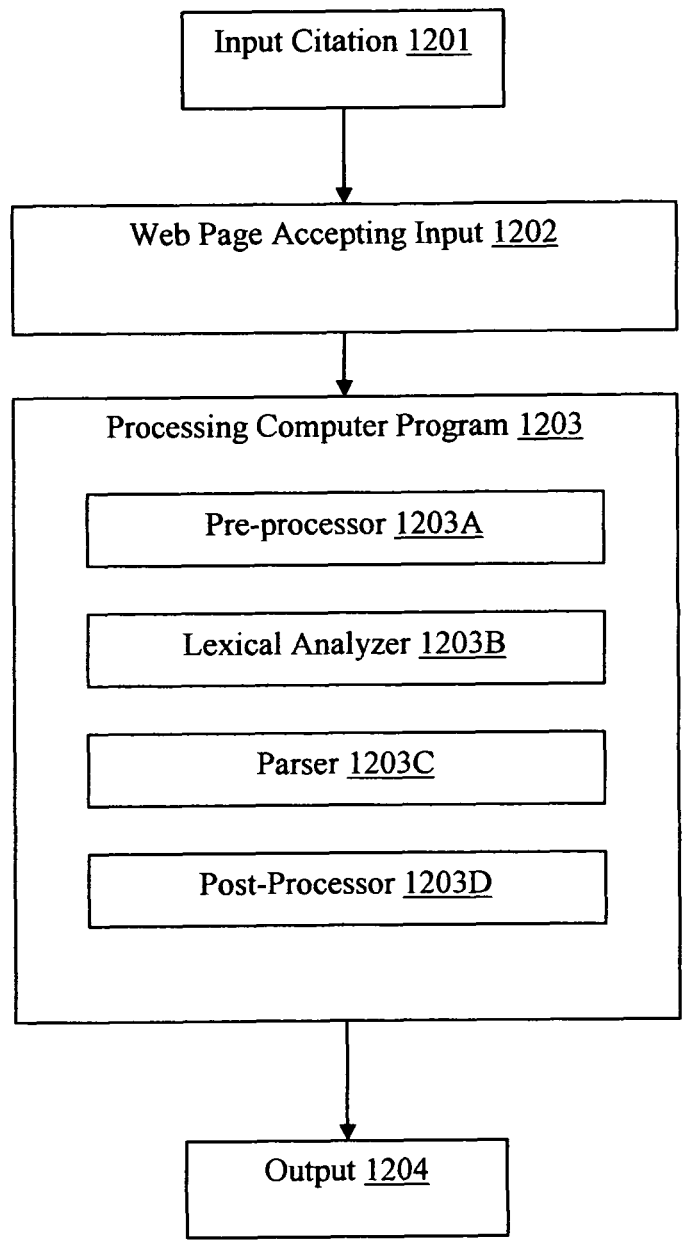
FIG. 12 shows an exemplary embodiment of the invention that can accept input through a web page.
Figure 13:
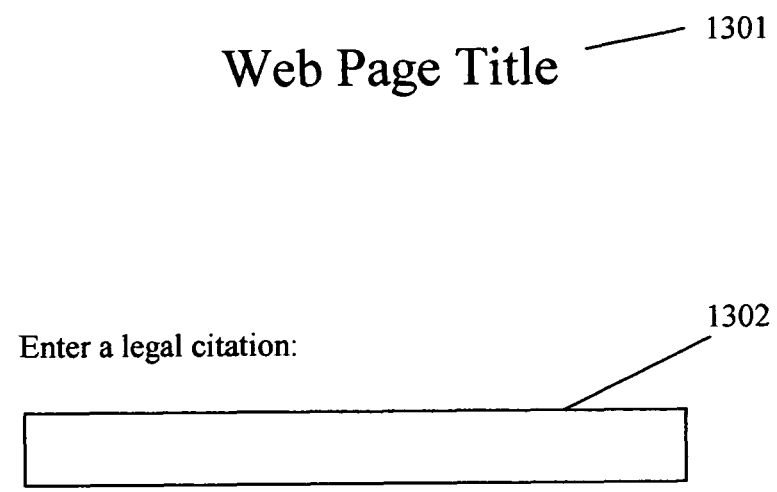
FIG. 13 shows an exemplary web interface for using an embodiment.

In an embodiment of the invention as shown in FIG. 12, a processing computer program 1203 on a computer server includes a lexical analyzer 1203B and a parser 1203C. The processing computer program may optionally include a pre-processor 1203A that operates before lexical analysis and post-processor that operates after parsing 1203D. The processing computer program may produce output 1204. The computer server hosts a website that includes a webpage 1202 that accepts input 1201. One implementation would use a web form as the webpage that accepts input. As shown in FIG. 13, the webpage may have a title 1301. The input may be accepted into a text box 1302.

A user on a computer system is connected to the computer server over a network. The term "network" would include a local area network (LAN), wide area network (WAN), the Internet, and the like. A legal citation is received from the user in the text box. The legal citation is then processed by the processing computer program on the computer server.

The output 1204 from the processing computer program may be displayed to the user. In some embodiments, the output may be displayed as a web page. In some embodiments, the output can include semantic information identified by the processing computer program, can include an identification of errors in the legal citation, and can include suggested corrections to the legal citation. In some embodiments, the identification of errors in the legal citation may comprise highlighting the erroneous parts of the legal citation or outputting a line and/or column number where the error exists in the legal citation. FIG. 14 shows one embodiment of an output page. The web page title 1401 is displayed. The citation 1403 is displayed and an error in the citation is highlighted 1402. Highlighting may comprise underlining the error, drawing a box around the error, changing text color or font, changing the text background color or font, or other methods of highlighting. The error interface component 1404 displays a list of errors. Error information may include a location of the error, such as column numbers, may include an identification of the error, and may include a suggested correction. The citation interpretation interface component 1405 displays semantic information from the citation. It may interpret the citation to display the semantic information of the citation.

In some embodiments the text box 1302 may accept as input a string citation containing multiple citations. In that case, the processing computer program 1203 can identify errors in each citation in the string citation. Each citation can be displayed, along with errors highlighted. Errors from all the citations can be summarized and displayed in the error interface component 1404. Semantic information for each citation can be displayed in the semantic information interface component 1405.

In some embodiments of the invention, buttons may be displayed on the webpage that is on the computer server. The buttons can allow the user to specify what type of citation the user has input. For example, the buttons can allow the user to specify that the citation is to a book, an article, a case, a statute, a constitution, or a regulation. Several different lexical analyzers and parsers may be written, each to a handle a specific kind of citation. For example, a lexical analyzer and parser may be written to handle only books. By having more narrowly tailored lexical analyzers and parsers, it may allow better identification of errors and better suggested corrections.

Figure 15:
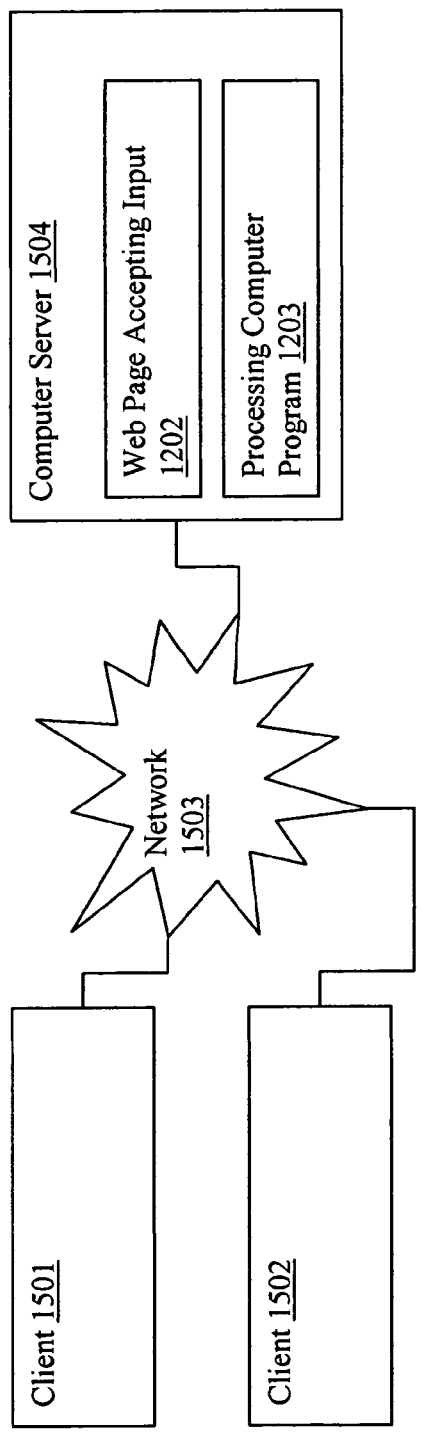
FIG. 15 shows an exemplary network architecture in which some embodiments may operate.

An exemplary network architecture where some embodiments of the invention may be practiced is shown in FIG. 15. Client computer systems 1501, 1502 connect over a network 1503 to a computer server 1504. The computer server has a web page 1202 and the processing computer program 1203.

Embodiment 2

Figure 16:
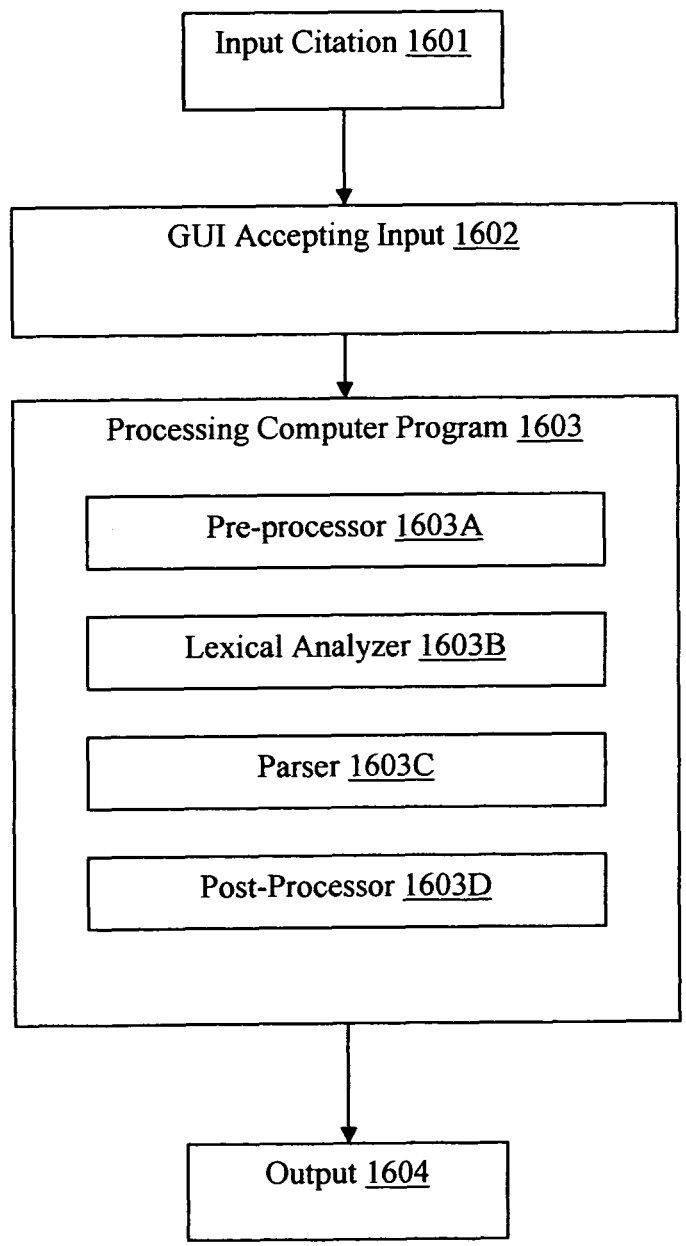
FIG. 16 shows an exemplary embodiment of the invention that can accept input through a graphical user interface (GUI).

In an embodiment of the invention as shown in FIG. 16, a processing computer program 1603 on a computer system includes a lexical analyzer 1603B and a parser 1603C. The processing computer program may optionally include a pre-processor 1603A that operates before lexical analysis and post-processor that operates after parsing 1603D. The processing computer program may produce output 1604. A graphical user interface (GUI) 1602 on the computer system accepts a citation 1601 as input. The citation may be processed by the processing computer program and output 1604 may be produced. The output 1604 can include identification of errors, suggested corrections, and semantic information from the citation.

One exemplary method of using a GUI 1602 to accept a citation as input is for the GUI 1602 to provide an input field where the user can type in a citation. The user can then press a button or perform some other action to indicate that the processing computer program 1603 should be run.

A second exemplary method of using a GUI 1602 to accept a citation as input is for the GUI 1602 to be a word processing program, such as Microsoft Word, Google Docs, or OpenOffice Writer. The user may open a legal document in the word processing program. The user then provides a citation by selecting a citation in the legal document. Selection can be made, for example, by highlighting a citation. Via the selection of a citation, the citation is accepted by the GUI as input and the processing computer program 1603 may be run on the citation.

Embodiment 3

Figure 17:
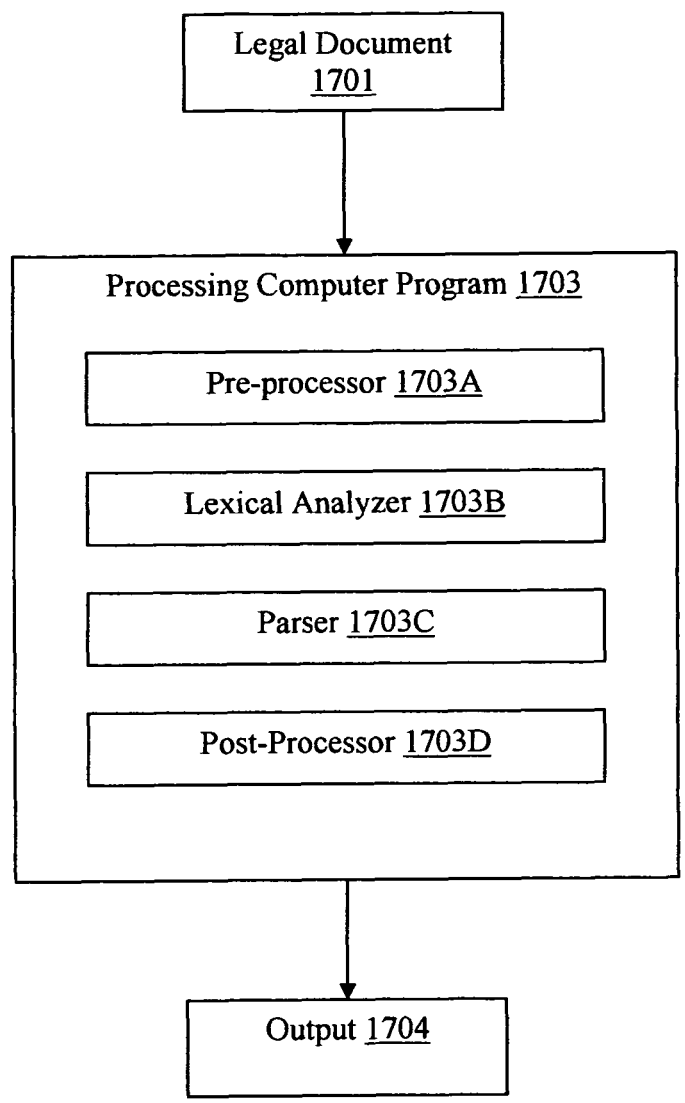
FIG. 17 shows an exemplary embodiment of the invention that can accept a legal document as input.

In an embodiment of the invention as shown in FIG. 17, a processing computer program 1703 on a computer system includes a lexical analyzer 1703B and a parser 1703C. The processing computer program may optionally include a pre-processor 1703A that operates before lexical analysis and post-processor that operates after parsing 1703D. The processing computer program may produce output 1704. The processing computer program can accept a legal document 1701 as input. A legal document is a document that would typically contain legal citations such as, but not limited to, a legal memo, brief, court filing, legislative document, court opinion, court order, or legal scholarship. Code in the processing computer program can identify the legal citations in the legal document. The code that identifies legal citations could use regular expressions or context-free grammar productions to match common legal citation formats. In other embodiments fuzzy matching can be used to identify text strings that are likely to be legal citations. For example, the location of legal citations in a legal document can be identified using fuzzy matching techniques as set forth in Rhoads et al. U.S. Patent Publication No. 2011/0066616 and Boucher U.S. Pat. No. 7,844,899. Rhoads et al. U.S. Patent Publication No. 2011/0066616 from paragraphs 35 through 37 is hereby incorporated by reference.

Another exemplary method of identifying legal citations for processing is as follows: For each type of legal citation (e.g. court case, statute, book, etc.) a universally unique identifier (UUID) can be defined. The UUID is an identifier that uniquely identifies the citation. Also, UUIDs would typically not exist in text that is not part of a citation. For instance, a UUID for a court case could be the volume number of a reporter, the reporter name, and a page number, whereas a UUID for a journal article could be the volume number of the journal, the journal name, and a page number. A textual search may be performed on a document to identify UUTDs, which may optionally involve use of regular expressions or a parser. With respect to court cases, the search may try to find a number followed by a reporter abbreviation followed by a number. With respect to periodical articles, it may try to find a number followed by a journal abbreviation followed by a number. With respect to statutes, it may try to find a code or session abbreviation and then search for nearby numbers or section symbols based on the appropriate format of the given code or session. With respect to book titles, it may identify each group of words that follows a comma and precedes a number (this is where a title would be located as per Bluebook format) and then compare the group of words against a list or database of known book titles. With respect to regulations, it may try to find a set of regulations abbreviation and then search for nearby numbers or section symbols based on the appropriate format of the given set of regulations. With respect to constitutions, it may try to find a constitution abbreviation and then search for nearby numbers representing articles or sections, based on the appropriate format of the given constitution. Errors in the UUID can be accounted for. A computer program can take a group of words and determine how close it is to a journal abbreviation, reporter abbreviation, set of regulations abbreviation, constitution abbreviation, and the like. A group of words that is close can be assumed to be an erroneous attempt at typing that abbreviation, and the correct abbreviation can be inserted in place of the erroneous text. One algorithm for determining closeness between textual sequences is edit distance. Once the UUID is identified, it may be desirable to locate the beginning and end of the citation. One method for doing this is to identify the beginning and ending of a citation by using punctuation. Based on the UUID the computer program knows what kind of citation format the reference should be in. Starting at the UUID, the program can search to the left to discover the start of the citation. Generally, a semicolon or a period would denote the leftmost endpoint of the citation (for Bluebook format, adopting other citation formats requires suitable modification). However, sometimes periods can appear in the citation itself such as a "v." in a court case name or with an author's middle initial in a periodical article or book. Therefore, the computer program generally should not consider one letter followed by a period to denote the left end of a citation, nor should it consider abbreviations followed by a period or including periods (e.g., "inc." or "co.") to denote the left end of a citation. Additionally, more advanced heuristics can be used, such as remembering what tokens are read during the leftward search so as not to terminate the citation too soon. For example, in a court case, the program might expect to encounter an "in re" or "ex parte" or "v." before the leftmost portion of the citation is reached. Similarly, starting at the UUID, the program can search to the right to discover the end of the citation. Generally, a semicolon or a period would denote the rightmost endpoint of the citation (for Bluebook format, adopting other citation formats requires suitable modification). However, the program generally should not consider one letter followed by a period to denote the right end of a citation, nor should it consider abbreviations followed by a period or including periods (e.g., "S.D.N.Y.") to denote the right end of a citation. Additionally, more advanced heuristics can be used, such as remembering what tokens are read during the rightward search so as not to terminate the citation too soon. For example, in a court case, the program might expect to encounter a ")" directly preceding the ending period or semicolon (if Bluebook format is used).

One exemplary method of providing a legal document to the processing computer program 1703 would be for the user to open the legal document in a word processing program, such as Microsoft Word, Google Docs, or OpenOffice Writer, and press a button or perform some other action to indicate that the processing computer program 1703 should be run on the legal document.

The identified legal citations can be processed using a lexical analyzer and parser to identify errors, suggest corrections, and output semantic information for the citations.

Embodiment 4

Figure 18:
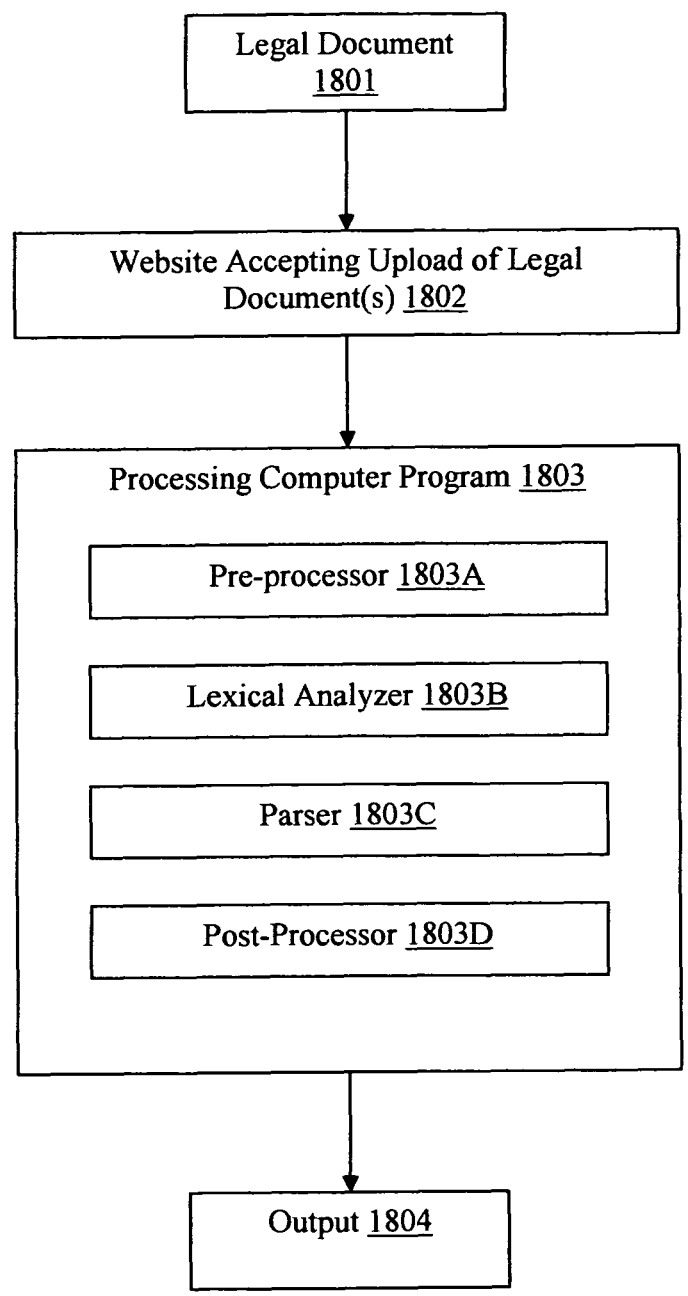
FIG. 18 shows an exemplary embodiment of the invention that can accept a legal document through a web page.

In an embodiment of the invention as shown in FIG. 18, a processing computer program 1803 on a computer server includes a lexical analyzer 1803B and a parser 1803C. The processing computer program may optionally include a pre-processor 1803A that operates before lexical analysis and post-processor that operates after parsing 1803D. The processing computer program may produce output 1804.

A user on a computer system is connected to the computer server over a network. A network can be a local area network (LAN), wide area network (WAN), or the Internet. The computer server can host a website 1802 where one or more legal documents 1801 can be uploaded.

The processing computer program can accept a legal document uploaded to the website as input. A legal document is a document that would typically contain legal citations such as, but not limited to, a legal memo, brief, court filing, legislative document, court opinion, court order, or legal scholarship. Code in the processing computer program can identify the legal citations in the legal document. The code that identifies legal citations could use regular expressions or context-free grammar productions to identify text strings that are likely to be legal citations. In other embodiments, fuzzy matching can be used to identify text strings that are likely to be legal citations. For example, the location of legal citations in a legal document can be identified using fuzzy matching techniques as set forth in Rhoads et al. U.S. Patent Publication No. 2011/0066616 and Boucher U.S. Pat. No. 7,844,899. Additional methods for identifying legal citations in a document have been discussed above.

The identified legal citations can be processed using a lexical analyzer and parser to identify errors, suggest corrections, and output semantic information for the citations.

8. Citations in Other Fields

Citations in other fields (non-legal) can also be analyzed using a lexical analyzer and parser. The same techniques described above in the context of legal citations can be applied to non-legal citations. When dealing with non-legal citations, the citation can be input into a processing computer program comprising an optional pre-processor, a lexical analyzer, a parser, and an optional post-processor. The lexical analyzer may accept a regular language. The parser may accept a context-free grammar. In some cases, the parser may implement shift/reduce parsing, and more specifically, GLR parsing, LR parsing, or LR(k) parsing. The output can include an identification of errors in the citation, suggested corrections, and semantic information from the citation.

In some embodiments, a string citation could be accepted as input into a processing computer program, and for each citation there can be output: errors in the citation, suggested corrections, and semantic information from the citation.

In some embodiments, a document can be accepted as input, and the citations in the document may be identified. The code that identifies citations could use regular expressions or context-free grammar productions to identify text strings that are likely to be citations. In other embodiments, fuzzy matching can be used to identify text strings that are likely to be citations. For example, the location of citations in a document can be identified using fuzzy matching techniques as set forth in Rhoads et al. U.S. Patent Publication No. 2011/0066616 and Boucher U.S. Pat. No. 7,844,899. Each citation may be processed by a lexical analyzer and parser in order to output an identification of errors in the citation, suggested corrections, and semantic information from the citation.

It is contemplated that embodiments of the invention could be used to process American Psychological Association (APA) citations. The APA format for citations has been specified in the APA manual.

An example APA citation for an article is as follows:
Wegener, D. T., & Petty, R. E. (1994). Mood management across affective states:
The hedonic contingency hypothesis. Journal of Personality & Social Psychology, 66, 1034-1048.

The format for such a citation could be captured by the following exemplary Bison production rule:
author_list OP NUMBER CP PERIOD title PERIOD apa_journal_name COMMA NUMBER COMMA pincite PERIOD The exemplary production rule uses symbols and tokens provided in the code provided in this specification and in the computer program listing appendix on CD filed with the application. The symbol apa_journal_name would need to be appropriately defined. The symbol could be defined to match a list of tokens that comprise known journal names. The author_list symbol may be modified to accept author names with last names first followed by a comma and first and middle initials.

Another example APA citation, this time for a book, is:
Calfee, R. C., & Valencia, R. R. (1991). *APA guide to preparing manuscripts for journal publication*. Washington, D.C.: American Psychological Association.

The format for such a citation could be captured by the following exemplary Bison production rule:
author_list OP NUMBER CP PERIOD title PERIOD word COMMA word COLON wordlist_PERIOD The exemplary production rule uses symbols and tokens provided in the code provided in this specification and in the computer program listing appendix on CD filed with the application. The author_list symbol may be modified to accept author names with last names first followed by a comma and first and middle initials.

As can be seen, the code disclosed in this specification and in the computer program listing appendix on CD filed with the specification can be extended to other, non-legal citations.

It is also contemplated that embodiments of the invention could be used to process medical citations, which are citations used in the medical community. Medical citations are often in American Medical Association (AMA) format. An example of an AMA citation is as follows (for a book):

Lugalla J B. *Poverty, AIDS, and Street Children in East Africa*. Lewiston, N.Y.: Mellen Press; 2003.

An exemplary Bison production rule that to match books would be:

author_list PERIOD title PERIOD word COMMA word COLON word_list SEMICOLON NUMBER PERIOD The exemplary production rule uses symbols and tokens provided in the code provided in this specification and in the computer program listing appendix on CD filed with the application. The author_list symbol may be modified so that a list of multiple authors is separated by commas only and without an "&" symbol.

These examples should make clear that embodiments of the invention can be used for other kinds of citations such as APA citations, AMA citations, and the like.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the claims of a non-provisional application.

What is claimed is:

1. A non-transitory computer-readable medium for storing instructions for checking the correctness of a citation, the non-transitory computer-readable medium comprising:
   instructions for receiving the citation from a user;
   a lexical analyzer for lexically analyzing the citation and outputting one or more tokens;
   a parser for parsing the citation by processing the tokens output from the lexical analyzer,
   wherein the parser was generated from a parser specification file by a parser generator, the parser specification file comprising:
   a start symbol, a court case citation symbol, a journal citation symbol, a statute citation symbol, and a constitution citation symbol,
   wherein the start symbol, the court case citation symbol, the journal citation symbol, the statute citation symbol, and the constitution citation symbol are non-terminal symbols that appear on the left-hand-side of one or more parser rules;
   instructions encoding one or more parser rules for expanding the start symbol into the court case citation symbol, the journal citation symbol, the statute citation symbol, and the constitution citation symbol;
   instructions encoding one or more parser rules for expanding the court case citation symbol into a party name symbol, a case reporter symbol, and a court name symbol;
   instructions encoding one or more parser rules for expanding the journal citation symbol into an author name symbol, an article title symbol, and a journal name symbol;
   instructions encoding one or more parser rules for expanding the statute citation symbol into a statute title number symbol, a code name symbol, and a statute section number symbol;
   instructions encoding one or more parser rules for expanding the constitution citation symbol into a constitution name symbol, a constitution article number symbol, and a constitution section number symbol;
   wherein the parser is a Generalized Left-to-Right, Rightmost Derivation (GLR) parser configured to produce a copy of the parser when an unresolved shift/reduce or reduce/reduce conflict is encountered, the resulting parsers each consuming a given input symbol before any proceed to the next, the resulting parsers disappearing if when they encounter a parsing error, the resulting parsers merging with another parser if when they have reduced the input to an identical set of symbols;
   instructions for providing for display an indication of one or more identified errors in the citation or an indication that no errors exist.

2. The non-transitory computer-readable medium of claim 1 further comprising:
   a data structure associating case reporters to courts whose cases are reported in the case reporters;
   instructions for determining whether a case reporter name in the citation is correctly associated with a court name in the citation.

3. The non-transitory computer-readable medium of claim 1 further comprising:
   instructions for determining whether a word in a party name in the citation should be abbreviated.

4. The non-transitory computer-readable medium of claim 1 further comprising:
   instructions for determining whether an abbreviation in a party name in the citation is correct or incorrect.

5. The non-transitory computer-readable medium of claim 1 further comprising:
   a data structure storing correct court names;
   instructions for determining whether a court name in the citation is correct or incorrect.

6. The non-transitory computer-readable medium of claim 1 further comprising:
   instructions for determining whether a word "and" in the citation should be abbreviated as "&".

7. The non-transitory computer-readable medium of claim 1 further comprising:
   instructions for determining whether an ending number of a pincite page range in the citation has an incorrect number of digits.

8. The non-transitory computer-readable medium of claim 1 further comprising:
   instructions for determining whether an ending number of a pincite range in the citation is greater than a beginning number of a pincite range.

9. The non-transitory computer-readable medium of claim 1, wherein the instructions for providing for display an indication of one or more identified errors in the citation or an indication that no errors exist include instructions for displaying the indication of one or more identified errors in the citation or the indication that no errors exist on a webpage.

10. The non-transitory computer-readable medium of claim 1, wherein the instructions for receiving the citation from a user include instructions for identifying a citation in an electronic document.

11. A method for checking the correctness of a citation using a computer system, the method comprising:
   receiving, by the computer system, the citation from a user;
   lexically analyzing the citation, by a lexical analyzer, and outputting one or more tokens;
   parsing the citation, by a parser, by processing the tokens output from the lexical analyzer,
   wherein the parser was generated from a parser specification file by a parser generator, the parser specification file comprising:
   a start symbol, a court case citation symbol, a journal citation symbol, a statute citation symbol, and a constitution citation symbol,
   wherein the start symbol, the court case citation symbol, the journal citation symbol, the statute citation symbol, and the constitution citation symbol are non-terminal symbols that appear on the left-hand-side of one or more parser rules;
   instructions encoding one or more parser rules for expanding the start symbol into the court case citation symbol, the journal citation symbol, the statute citation symbol, and the constitution citation symbol;
   instructions encoding one or more parser rules for expanding the court case citation symbol into a party name symbol, a case reporter symbol, and a court name symbol;
   instructions encoding one or more parser rules for expanding the journal citation symbol into an author name symbol, an article title symbol, and a journal name symbol;
   instructions encoding one or more parser rules for expanding the statute citation symbol into a statute title number symbol, a code name symbol, and a statute section number symbol;
   instructions encoding one or more parser rules for expanding the constitution citation symbol into a constitution name symbol, constitution article number symbol, and a constitution section number symbol;
   wherein the parser is a Generalized Left-to-Right, Rightmost Derivation (GLR) parser configured to produce a copy of the parser when an unresolved shift/reduce or reduce/reduce conflict is encountered, the resulting parsers each consuming a given input symbol before any proceed to the next, the resulting parsers disappearing if when they encounter a parsing error, the resulting parsers merging with another parser if when they have reduced the input to an identical set of symbols;
   providing for display an indication of one or more identified errors in the citation or an indication that no errors exist.

12. The method of claim 11 further comprising:
   accessing a data structure associating case reporters to courts whose cases are reported in the case reporters;
   determining whether a case reporter name in the citation is correctly associated with a court name in the citation.

13. The method of claim 11 further comprising:
   determining whether a word in a party name in the citation should be abbreviated.

14. The method of claim 11 further comprising:
   determining whether an abbreviation in a party name in the citation is correct or incorrect.

15. The method of claim 11 further comprising:
   accessing a data structure storing correct court names;
   determining whether a court name in the citation is correct or incorrect.

16. The method of claim 11 further comprising:
   determining whether a word "and" in the citation should be abbreviated as "&".

17. The method of claim 11 further comprising:
   determining whether an ending number of a pincite page range in the citation has an incorrect number of digits.

18. The method of claim 11 further comprising:
   determining whether an ending number of a pincite range in the citation is greater than a beginning number of a pincite range.

19. The method of claim 11, wherein the step of providing for display an indication of one or more identified errors in the citation or an indication that no errors exist comprises displaying the indication of one or more identified errors in the citation or the indication that no errors exist on a webpage.

20. The method of claim 11, wherein the step of receiving the citation from a user comprises identifying a citation in an electronic document.

* * * * *

UNITED STATES PATENT AND TRADEMARK OFFICE
CERTIFICATE OF CORRECTION

PATENT NO. : 8,713,031 B1  
APPLICATION NO. : 13/507918  
DATED : April 29, 2014  
INVENTOR(S) : Bryant Christopher Lee Page 1 of 1

It is certified that error appears in the above-identified patent and that said Letters Patent is hereby corrected as shown below:

On the Title Page, Item (56) under OTHER PUBLICATIONS, on line 17, add -- Copy w/ Cite. -- before "[online] [retrieved Oct. 7, 2012] http://www.google.com/url?sa=t".

In the Specification

Column 12, line 14, delete "CODE_AB_S_S_P", add -- CODE_AB_S_P --.

In the Claims

Column 21, line 52 to column 22, line 12, add an additional indentation to the text beginning with "a start symbol, a court case" and ending with "constitution section number symbol".

Column 23, lines 15–42, add an additional indentation to the text beginning with "a start symbol, a court case" and ending with "constitution section number symbol".

Column 22, lines 19–20, delete "if".

Column 22, line 21, delete "if".

Column 24, line 4, delete "if".

Column 24, line 6, delete "if".

Column 23, line 41, add -- a -- before "constitution article number symbol".

Signed and Sealed this  
Second Day of September, 2014

Michelle K. Lee  
*Deputy Director of the United States Patent and Trademark Office*